US012716576B2

(12) United States Patent
Zhang

(10) Patent No.: US 12,716,576 B2

(45) Date of Patent: Aug. 25, 2026

(54) TRACK LIGHT

(71) Applicants: SUZHOU OPPLE LIGHTING CO., LTD., Suzhou City (CN); OPPLE LIGHTING CO., LTD., Shanghai (CN)

(72) Inventor: Wang Zhang, Suzhou City (CN)

(73) Assignees: SUZHOU OPPLE LIGHTING CO., LTD., Suzhou City (CN); OPPLE LIGHTING CO., LTD., Shanghai (CN)

( * ) Notice: Subject to any disclaimer, the term of this patent is extended or adjusted under 35 U.S.C. 154(b) by 0 days.

(21) Appl. No.: 19/221,261

(22) Filed: May 28, 2025

(65) Prior Publication Data

US 2025/0290621 A1 Sep. 18, 2025

Related U.S. Application Data

(63) Continuation of application No. PCT/CN2023/135778, filed on Dec. 1, 2023.

(30) Foreign Application Priority Data

Dec. 1, 2022 (CN) ......................... 202223205361.9

(51) Int. Cl.

| | |
|---|---|
| ***F21V 21/005*** | (2006.01) |
| ***F21S 4/20*** | (2016.01) |
| ***F21V 23/06*** | (2006.01) |

(52) U.S. Cl.

CPC .............. *F21V 21/005* (2013.01); *F21S 4/20* (2016.01); *F21V 23/06* (2013.01)

(58) Field of Classification Search

CPC ................................. F21V 17/10; F21V 17/16

See application file for complete search history.

(56) References Cited

U.S. PATENT DOCUMENTS

| | | | | |
|---|---|---|---|---|
| 12,372,224 B2 * | 7/2025 | Yang | ........................ | F21V 23/06 |
| 2017/0184290 A1 * | 6/2017 | Chiu | ........................ | F21V 21/35 |

FOREIGN PATENT DOCUMENTS

| | | | | |
|---|---|---|---|---|
| CN | 111536450 A * | 8/2020 | ................ | F21S 8/00 |
| CN | 111828885 A * | 10/2020 | ................ | F21S 8/02 |

(Continued)

OTHER PUBLICATIONS

English Machine Translation of CN 111536450 (Year: 2021).*

International Search Report issued in PCT Application No. PCT/CN2023/135778 dated Feb. 22, 2024, (5p).

*Primary Examiner* — Zheng Song

(74) *Attorney, Agent, or Firm* — Arch & Lake LLP; Hao Tan; Shen Wang

(57) ABSTRACT

A track light belongs to the field of lighting technology is provided. The track light includes a track, and a lamp in electrical contact with the track, the lamp includes a substrate, an elastic structure, and a power obtain structure plugged and fixed on the substrate, the substrate is provided with a through hole, the elastic structure includes a mounting post and an elastic portion, the mounting post is accommodated in the through hole and is in contact with an inner wall of the through hole, a power transmission strip is provided in the track, the power obtain structure includes an abutment portion in electrical contact with the power transmission strip, the elastic portion is provided between the abutment portion and the substrate to generate elastic deformation in response to that the abutment portion and the power transmission strip are pressed against each other.

10 Claims, 7 Drawing Sheets

(56) References Cited

FOREIGN PATENT DOCUMENTS

| | | | | | |
|---|---|---|---|---|---|
| CN | 212618185 | U | | 2/2021 | |
| CN | 213019533 | U | | 4/2021 | |
| CN | 213177947 | U | | 5/2021 | |
| CN | 115064890 | A | | 9/2022 | |
| CN | 218599653 | U | | 3/2023 | |
| CN | 2018763075 | U | | 3/2023 | |
| KR | 20150008964 | A | * | 1/2015 | ............ F21V 17/164 |

* cited by examiner

TRACK LIGHT

CROSS-REFERENCE TO RELATED APPLICATION

This application is based upon and claims the priority of PCT patent application No. PCT/CN2023/135778 filed on Dec. 1, 2023, which claims priority to the Chinese patent application No. 202223205361.9 filed on Dec. 1, 2022, the entire content of both of which is hereby incorporated by reference herein for all purposes.

TECHNICAL FIELD

The disclosure relates to a track light, and belongs to the field of lighting technology.

BACKGROUND

In order to satisfy the requirements of quick disassembly and assembly, track lamp uses copper sheets arranged on the lamp to obtain power from the track.

SUMMARY

The present disclosure provide a track light.

Accordingly, the track light provided in this disclosure may include a track, and a lamp in electrical contact with the track.

The lamp may include a substrate, an elastic structure detachably connected to the substrate, and a power obtain structure plugged and fixed on the substrate, the substrate may be provided with a through hole, the elastic structure may include a mounting post and an elastic portion, the mounting post may be accommodated in the through hole and may be in contact with an inner sidewall of the through hole.

A power transmission strip may be provided in the track, and the power obtain structure may include an abutment portion in electrical contact with the power transmission strip, the elastic portion may be provided between the abutment portion and the substrate to generate elastic deformation in response to that the abutment portion and the power transmission strip are pressed against each other, so that the abutment portion and the power transmission strip remain abutted with each other.

It is to be understood that both the foregoing general description and the following detailed description are exemplary and explanatory only and are not restrictive of the present disclosure.

DETAILED DESCRIPTION

Figure 1:
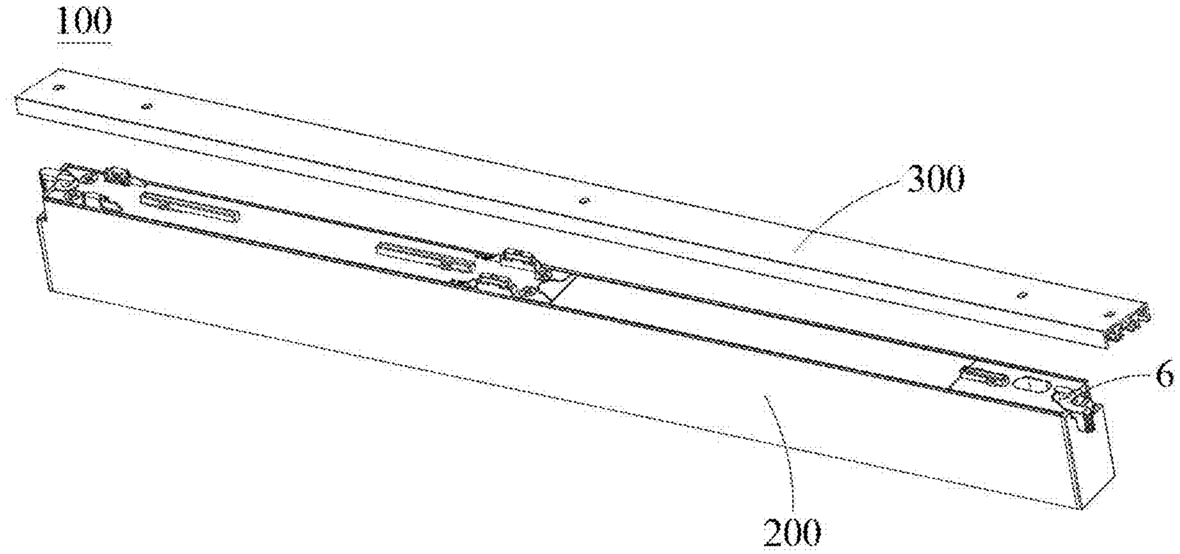
FIG. 1 is a schematic perspective view of a track light according to an example of the present disclosure.

In order to make the purpose, technical solutions and advantages of the present disclosure clearer, the present disclosure will be described in detail below with reference to the accompanying drawings and examples.

Description of reference numerals in this disclosure may include: track light 100, lamp 200, track 300, substrate 1, power obtain portion 11, through hole 111, support bridge 112, locking portion 12, power obtain structure 2, abutment portion 21, convex hull 211, connection portion 22, elastic structure 3, mounting post 31, elastic portion 32, inclined surface 33, housing 4, light-emitting component 5, lock catch 6, circuit board 7, power transmission strip 8, conductive groove 9, lock catch groove 10.

In order to satisfy the requirements of quick disassembly and assembly, track lamp uses copper sheets arranged on the lamp to obtain power from the track. The fixation of the copper sheet often adopts a spring structure. By setting a spring on the copper sheet and the substrate of the lamp, the spring resists the copper sheet. In response to that the lamp is installed on the track, the copper sheet is abutted with a copper strip of the track, and the spring is always in a compressed state, so that the copper sheet is attached to the copper strip to satisfy the power obtain requirements.

Currently, for a new track lamp on the market, in order to satisfy the requirements of ultra-thin and ultra-narrow track, the size of the track lamp is reduced. Due to the limited size, it is impossible to place a spring structure in the track lamp to obtain power. Therefore, it is only possible to use plastic deformation of the copper sheet itself to satisfy the requirements of obtaining power from the track. However, due to the poor plastic resilience of the copper sheet, it is difficult to rebound or has insufficient resilience, so the reliability of obtaining power through the deformation and rebound of the copper sheet itself to resist the track copper strip to achieve obtaining power is not high. In response to that the copper sheet is installed once, the copper sheet deforms and the bump moves downward. In response to that the copper sheet is installed again, it may be difficult to obtain power, which is not conducive to repeated installation of the lamp.

In response to the above problems, some lamps on the market also solve the problem of poor resilience of the copper sheet itself by arranging plastic elastic sheet integrally formed with the substrate on the substrate. However, this solution cannot improve track lights that have been produced or are already in use, so that the track lights that have been produced or are already in use can only be discarded, resulting in a large waste of resources.

In view of this, it is necessary to propose improvements to track lights to solve the above problems.

Figure 2:
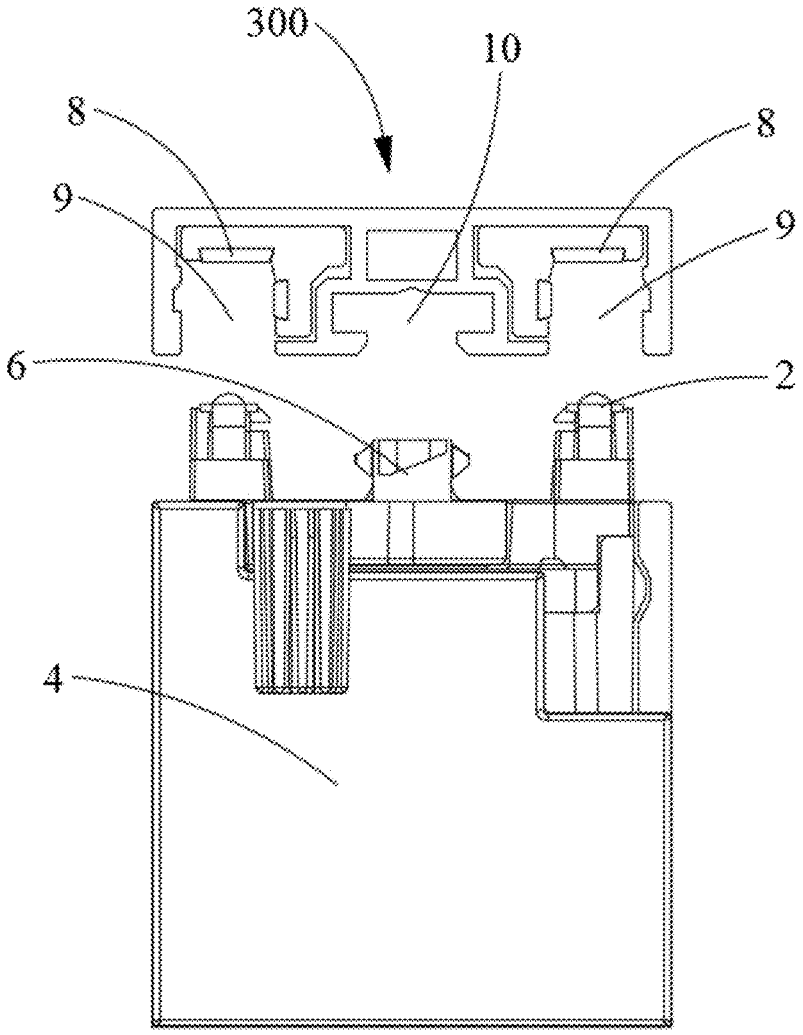
FIG. 2 is a right side view of the track light of FIG. 1.

Referring to FIG. 1 and FIG. 2, the present disclosure discloses a track light 100, which is used for removably illuminating the outside. The track lamp 100 includes a track 300 and a lamp 200 detachably electrically connected to the track 300, an external power supply is connected to the track 300, the track 300 is electrically connected to the lamp 200, and power is supplied to the lamp 200 through the track 300, so that the lamp 200 emits light and illuminates an illuminated object.

Referring to FIG. 3 to FIG. 6, the lamp 200 includes a substrate 1, a power obtain structure 2, an elastic structure 3, a housing 4 and a light-emitting component 5. An accommodation space is provided in the housing 4, and the substrate 1 matches the housing 4 and is arranged on the top of the housing 4, so that a portion of the substrate 1 can be accommodated in the accommodation space, and at the same time, the accommodation space is covered to close the housing 4. The power obtain structure 2 is plugged and fixed on the substrate 1 to connect two sides of the substrate 1. The side of the power obtain structure 2 away from the housing 4 is in electrical contact with the track 300, and the side of the power obtain structure 2 close to the housing 4 extends into the accommodation space and is electrically connected to the light-emitting component 5 accommodated in the accommodation space, so that the track 300 supplies power to the light-emitting component 5 through the power obtain structure 2. The elastic structure 3 is detachably connected to the substrate 1, and is arranged between the power obtain structure 2 and the substrate 1. In response to that the lamp 200 is connected to the track 300, the power obtain structure 2 is abutted with the track 300, and the power obtain structure 2 is capable of moving toward a direction close to the substrate 1 in a case of being subjected to external pressure, so as to keep the power obtain structure 2 being abutted with the track 300. In response to that the external pressure disappears, the power obtain structure 2 is capable of moving toward a direction away from the substrate 1 under an action of the elastic structure 3, which avoids the deformation of the power obtain structure 2 and realizes repeated installation and use of the lamp 200.

The substrate 1 is provided with a through hole 111, the elastic structure 3 includes a mounting post 31 and an elastic portion 32, the mounting post 31 is accommodated in the through hole 111 and is in close contact with the sidewall of the through hole 111, a power transmission strip 8 is provided in the track 300, the power obtain structure 2 includes an abutment portion 21 capable of being electrically contacted with the power transmission strip 8, and the elastic portion 32 is provided between the abutment portion 21 and the substrate 1 to produce elastic deformation in response to that the abutment portion 21 and the power transmission strip 8 are pressed against each other, so that the abutment portion 21 and the power transmission strip 8 remain abutted with each other. Specifically, the substrate 1 is provided with a power obtain portion 11 extending toward the track 300, the through hole 111 is provided in the power obtain portion 11 and penetrates the power obtain portion 11, and a portion of the power obtain structure 2 passes through the through hole 111 to be connected with the power obtain portion 11, the elastic structure 3 is provided between the power obtain portion 11 and the power obtain structure 2 and is detachably connected to the power obtain portion 11, a conductive groove 9 is provided in the track 300, and the power transmission strip 8 is arranged at the bottom of the conductive groove 9. In response to that the lamp 200 is connected to the track 300, the power obtain portion 11 is capable of extending into the conductive groove 9, and allow the power obtain structure 2 and the power transmission strip 8 to be abutted with each other, that is to say, the power obtain structure 2 and the elastic structure 3 are both arranged on the power obtain portion 11, in response to that the lamp 200 is connected with the track 300, the power obtain portion 11 extends into the track 300 and allows the power obtain structure 2 to be electrically connected with the power transmission strip 8 in the track 300, so that the track 300 is capable of supplying power to the lamp 200 through the power obtain structure 2.

The power obtain portion 11 is arranged in a shape of long strip, and the extending direction of the power obtain portion 11 is the same as the long edge direction of the lamp 200. Two through holes 111 are provided in the power obtain portion 11, and the two through holes 111 are respectively provided on two ends of the power obtain portion 11 and penetrate the power obtain portion 11. The power obtain structure 2 further includes a connecting portion 22 connected to the abutment portion 21, two connecting portions 22 are provided corresponding to the through holes 111 and are respectively provided at both ends of the abutment portion 21. The connection portion 22 penetrates the through hole 111 to supply power to the light-emitting component 5 accommodated in the housing 4. At the same time, the connection portion 22 can also move up and down relative to the substrate 1. On the one hand, the power obtain structure 2 can move toward the lamp 200 in a case of being connected to the track 300, so as to achieve close contact with the track 300. On the other hand, in response to that the power obtain structure 2 is separated from the track 300, the power obtain structure 2 can move in a direction away from the lamp 200 under the action of the elastic structure 3 to achieve rebound of the power obtain structure 2.

Two mounting posts 31 of the elastic structure 3 are also provided corresponding to the through holes 111, the two mounting posts 31 are respectively provided at both ends of the elastic portion 32. In response to that the mounting post 31 is accommodated in the through hole 111, three side surfaces of the mounting post 31 are in close contact with the sidewall of the through hole 111, in this arrangement, the elastic structure 3 will not fall off from the substrate 1 in a free state, and the operator can detach the elastic structure 3 from the substrate 1 by using an external tool (such as a tweezer). The power obtain portion 11 further includes a support bridge 112 arranged between the two through holes 111, both the mounting post 31 and the connection portion 22 can be accommodated in the through hole 111, and the mounting post 31 is arranged between the connection portion 22 and the support bridge 112, and the connection portion 22 can move relative to the mounting post 31. In this arrangement, on one hand, a detachable connection between the elastic structure 3 and the power obtain portion 11 can be realized, and the elastic structure 3 is prevented from falling off from the power obtain portion 11 in a free state. On the other hand, the power obtain structure 2 can move up and down relative to the substrate 1, thereby enhancing the power transmission effect between the power obtain structure 2 and the power transmission strip 8.

Preferably, the power obtain structure 2 is a U-shaped metal sheet, preferably a copper sheet, and the elastic structure 3 is a U-shaped silicone pad. In response to being connected, the upper surface of the elastic portion 32 is in contact with the abutment portion 21, and the lower surface of the elastic portion 32 is in contact with the support bridge 112, so that in response to that the abutment portion 21 is forced to move toward the substrate 1, the abutment portion 21 and the support bridge 112 jointly squeeze the elastic portion 32, and in response to that the external force disappears, the abutment portion 21 moves in a direction away from the substrate 1 under the elastic force of the elastic portion 32.

In other examples, a partition plate can be provided in the through hole 111 to separate the mounting post 31 and the connection portion 22, so that the three side surfaces of the mounting post 31 are in contact with the sidewall of the through hole 111, and the fourth sidewall is attached to the partition plate to achieve a tight connection between the elastic structure 3 and the substrate 1. At the same time, due to the separation of the partition plate, the connection portion 22 will not contact the mounting post 31 in the case of moving up and down, which prevents the mounting post 31 from sliding out of the through hole 111 under the driving of the connection portion 22. The through hole 111 can be only one and be arranged in the middle of the power obtain portion 11. In this case, the elastic structure 3 is arranged in a shape of T, and the through hole 111 can be a blind hole, and the power obtain portion 11 is also provided with two through holes penetrating through the power obtain portion 11, the two through holes are respectively arranged on both sides of the through hole 111, the mounting post 31 is accommodated in the through hole 111, and the connection portion 22 passes through the through hole to supply power to the lamp 200; there may be only one connection portion 22, one mounting post 31 and one through hole 111, in this case, the three are all arranged on the same side of the power obtain portion 11 and are arranged correspondingly, which is not limited here.

Figure 5:
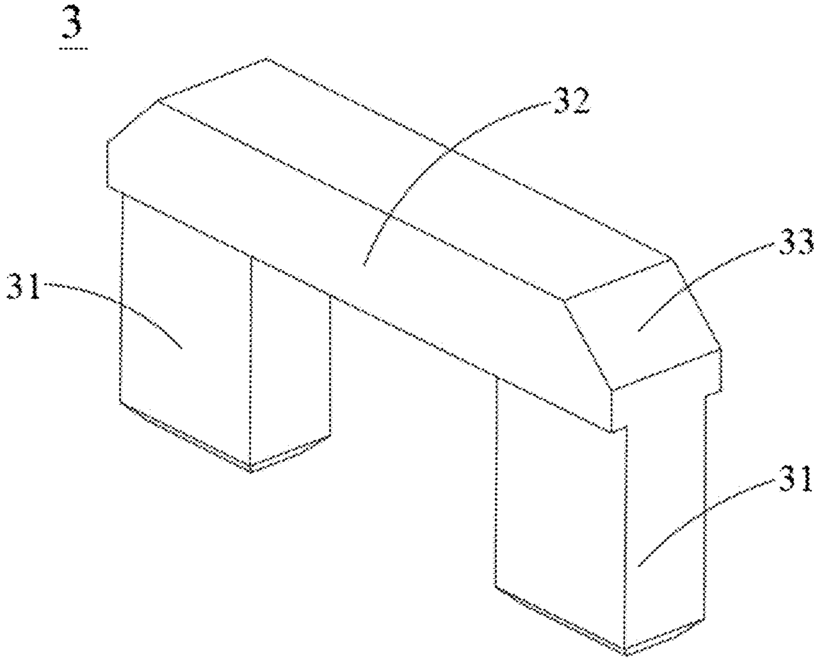
FIG. 5 is a schematic perspective view of an elastic structure in FIG. 4.
Figure 6:
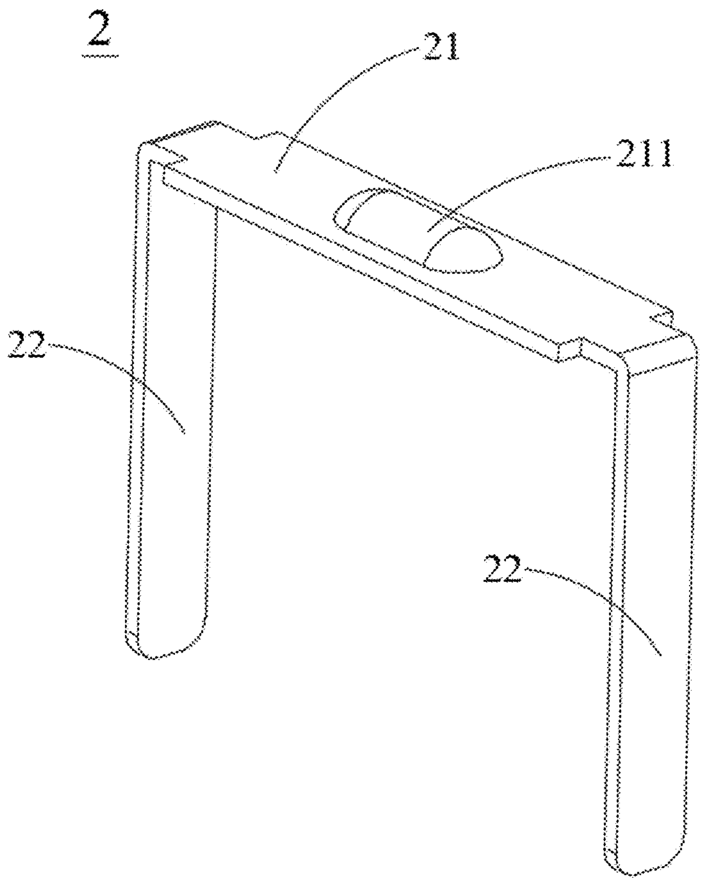
FIG. 6 is a schematic perspective view of a power obtain structure in FIG. 4.
Figure 7:
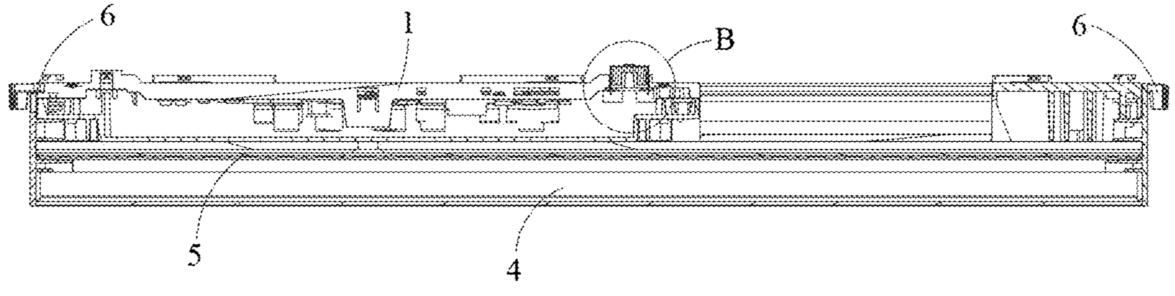
FIG. 7 is a cross-sectional view of the track light of FIG. 1.
Figure 8:
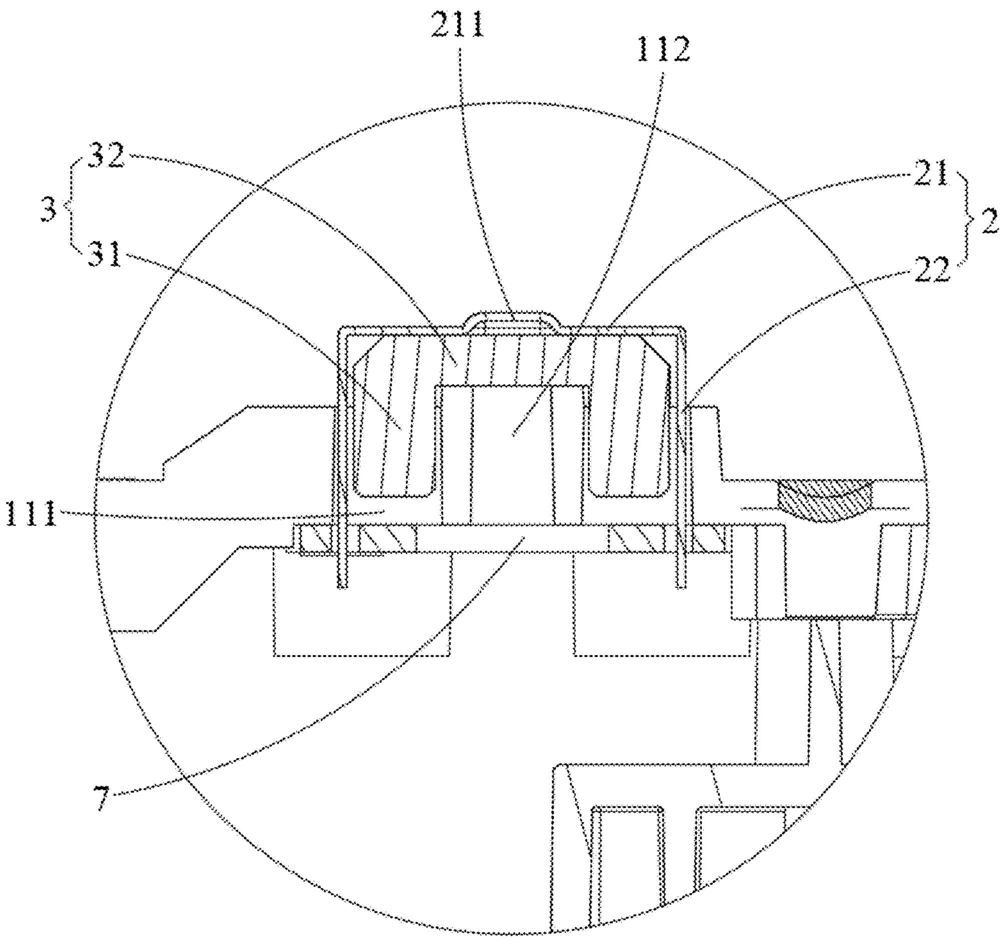
FIG. 8 is an enlarged view of portion B in FIG. 7.

Specifically, referring to FIG. 5 and FIG. 6, the elastic structure 3 is also provided with an inclined surface 33. Specifically, two inclined surfaces 33 are provided and are provided at both ends of the elastic portion 32, and a position where the inclined surface 33 is provided corresponds to the connection portion 22, the inclined surface 33 extends obliquely from the upper surface of the elastic portion 32 toward the substrate 1, so as to guide the power obtain structure 2 during assembly. In response to that the end of the connection portion 22 away from the abutment portion 21 abuts against the inclined surface 33, the connection portion 22 can slide outward under the guidance of the inclined surface 33, so that the two connecting portions 22 are respectively arranged on the outside of the two mounting posts 31. In other examples, no inclined surface 33 is provided on the elastic structure 3, which is not limited here.

In the short edge direction of the lamp 200, the size of the elastic portion 32 is larger than the size of the mounting post 31, so as to form a platform at the connection position between the elastic portion 32 and the mounting post 31. In response to that the mounting post 31 extends into the through hole 111, the elastic portion 32 is abutted with the periphery of the through hole 111 through the platform, thereby increasing the contact area between the elastic portion 32 and the power obtain portion 11, and improving the installation stability of the elastic structure 3 and the power obtain portion 11. The size of the elastic portion 32 is also larger than the size of the abutment portion 21, so that the abutment portion 21 and the elastic portion 32 are in stable abutment, which prevents the abutment portion 21 from sliding off from the elastic portion 32, and improves the connection stability between the abutment portion 21 and the elastic portion 32.

The middle position of the abutment portion 21 is provided with a convex hull 211 protruding toward the track 300. In response to that the abutment portion 21 extends into the conductive groove 9, the convex hull 211 is abutted with the power transmission strip 8, thereby improving the connection stability between the abutment portion 21 and the power transmission strip 8, and avoiding poor contact between the abutment portion 21 and the power transmission strip 8.

In this example, two power obtain portions 11 are arranged opposite to each other on the substrate 1, and two conductive grooves 9 and two power transmission strips 8 on the track 300 are also provided correspondingly, so as to transmit a positive current and a negative current respectively to ensure the normal light emitting of the lamp 200. In other examples, the number of power obtain portions 11 can be set according to the actual situation, for example, set to one, three or four. In response to setting to one, the lamp 200 is connected to the floor or wall or other metal devices arranged on the floor or wall through other devices, which is not limited here.

Figure 3:
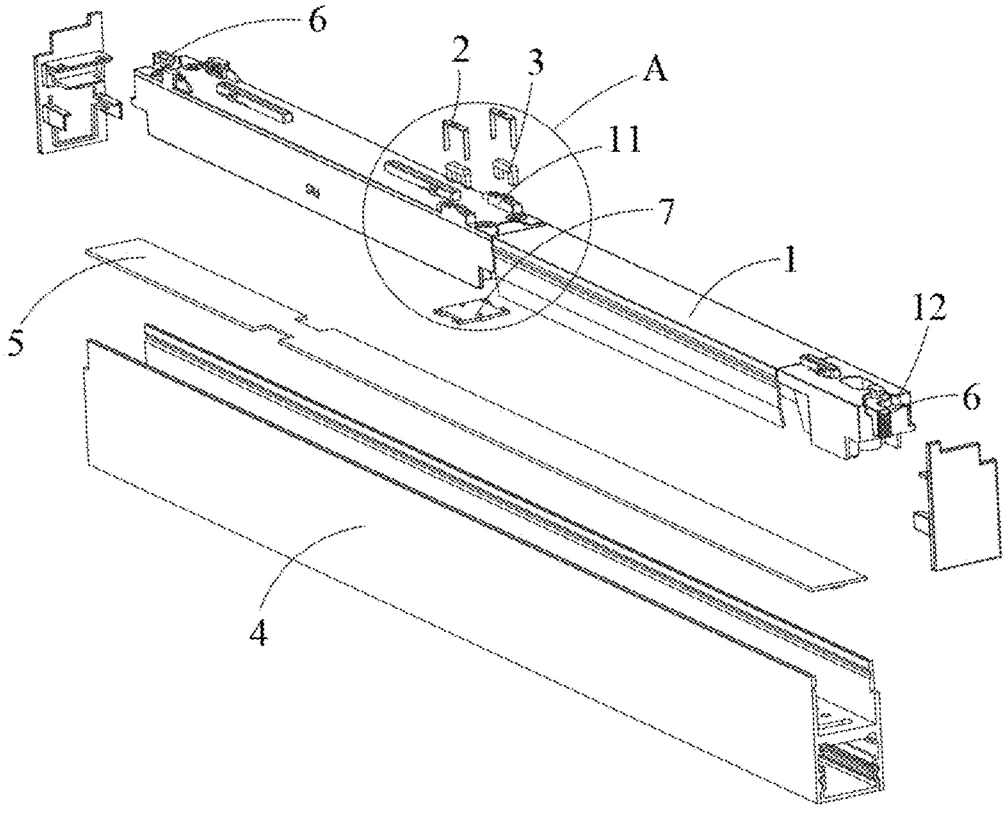
FIG. 3 is an exploded view of the track light of FIG. 1.
Figure 4:
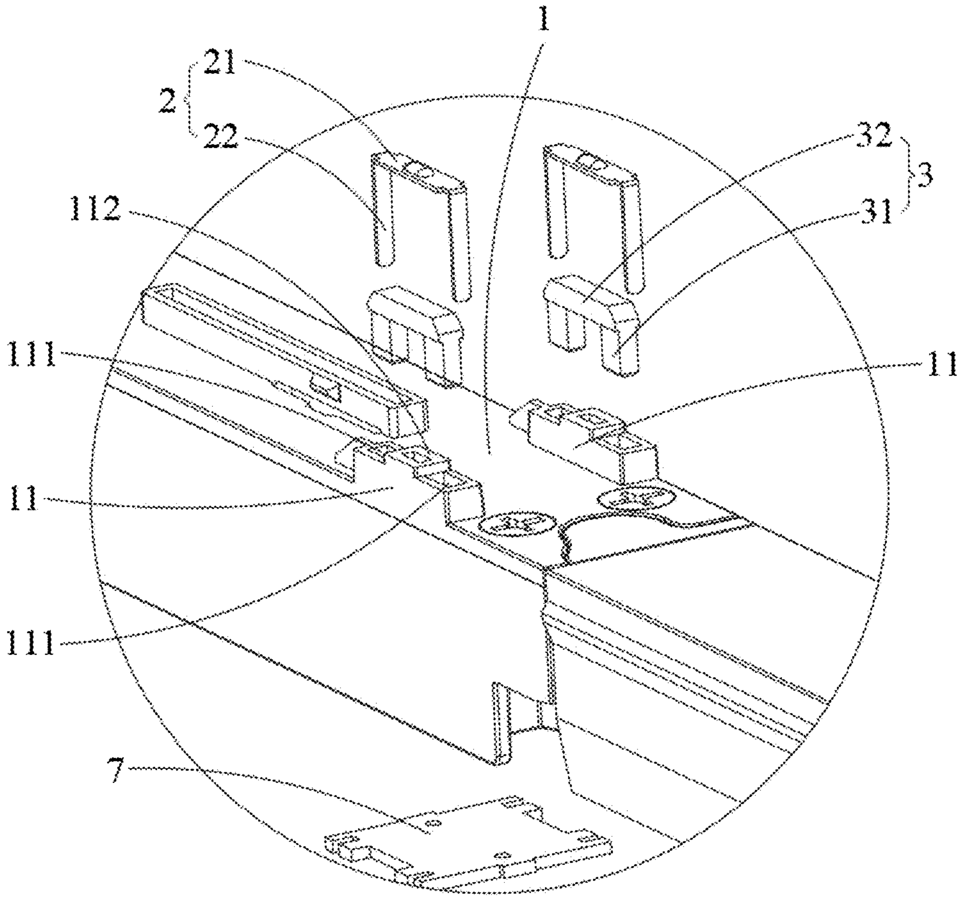
FIG. 4 is an enlarged view of portion A in FIG. 3.

Specifically, referring to FIG. 3 and FIG. 4, the lamp 200 further includes a circuit board 7 and a wire, and the circuit board 7 and the wire are accommodated in the housing 4, and the circuit board 7 is not fixed with the housing 4, so that the circuit board 7 is in a suspended state in the housing 4, and one end of the connection portion 22 away from the abutment portion 21 passes through the through hole 111 on the substrate 1 and is electrically connected to the circuit board 7 accommodated in the housing 4, so that the circuit board 7 can move synchronously with the power obtain structure 2. In this arrangement, on one hand, the track 300 can supply power to the circuit board 7 through the power obtain structure 2, and on the other hand, the power obtain structure 2 is limited to the power obtain portion 11 through the circuit board 7, which preventing the power taking structure 2 from falling off from the perforation 111 during use, and at the same time, the suspended state of the circuit board 7 is maintained through the power taking structure 2. The light-emitting component 5 is fixedly connected to the housing 4, and the circuit board 7 is electrically connected to the light-emitting component 5 through wires, so that when the circuit board 7 moves following the power taking structure 2, the light-emitting component 5 remains stationary, so that the track 300 can pass through the power taking structure 2, the circuit board 7 and the wires supply power to the light-emitting component 5. Preferably, the wires are flexible wires to adapt the movement of the circuit board 7 relative to the light-emitting component 5.

Referring specifically to FIG. 2, locking parts 12 are also provided at both ends of the base plate 1, the locking parts 12 are provided with locking holes, the lamp 200 also includes a lock 6 matching the locking holes, and the track 300 is provided with lock groove 10, wherein the lock groove 10 is provided between the two conductive grooves 9 and is located in the middle position, the lock 6 passes through the locking hole and cooperates with the lock groove 10, the lock catch 6 is rotated so that the lock catch 6 is abutted with the sidewall of the lock catch groove 10 to achieve a locking connection between the lamp 200 and the track 300. Preferably, the rotation angle of the lock catch 6 is 90°.

In summary, the track light 100 of the present disclosure provides an elastic structure 3 between the substrate 1 and the power obtain structure 2, so that the power obtain structure 2 can move toward the substrate 1 in a case of being subjected to external pressure, in response to that the external pressure disappears, the power obtain structure 2 can move away from the substrate 1 under the action of the elastic structure 3, which avoids deformation of the power obtain structure 2 and realizes repeated installation and use of the lamp 200; by providing the through hole 111 in the substrate 1, and allowing the mounting post 31 to be accommodated in the through hole 111 and closely attached to the sidewall of the through hole 111, the elastic structure 3 can be detachably connected to the substrate 1, so that operators can improve the track light 100 that have been produced or is already in use, extending the service life of the track light 100 and avoiding waste of resources; By arranging the mounting post 31 to abut against the sidewall of the through hole 111, the elastic structure 3 is prevented from falling off from the substrate 1 in a free state; By setting the size of the elastic portion 32 to be larger than the size of the mounting post 31, the elastic portion 32 is capable of being abutted with the edge of the through hole 111, thereby increasing the contact area between the elastic portion 32 and the substrate 1.

The purpose of the present disclosure is to provide a track light to solve the problem that the copper sheet in existing track lights has poor resilience and cannot be continuously improved, resulting in a waste of resources.

In order to achieve the above purpose, the present disclosure provides a track light, including a track, and a lamp in electrical contact with the track, the lamp includes a substrate, an elastic structure detachably connected to the substrate, and a power obtain structure plugged and fixed on the substrate, the substrate is provided with a through hole, the elastic structure includes a mounting post and an elastic portion, the mounting post is accommodated in the through hole and is in contact with an inner sidewall of the through hole, a power transmission strip is provided in the track, and the power obtain structure includes an abutment portion in electrical contact with the power transmission strip, the elastic portion is provided between the abutment portion and the substrate to generate elastic deformation in response to that the abutment portion and the power transmission strip are pressed against each other, so that the abutment portion and the power transmission strip remain abutted with each other.

Optionally, the substrate is provided with a power obtain portion extending toward the track, the power obtain structure is plugged and fixed with the power obtain portion, and the elastic structure is provided between the power obtain portion and the power obtain structure and is detachably connected with the power obtain portion, a conductive groove is provided in the track, the power transmission strip is provided in the conductive groove, and the power obtain portion is capable of extending into the conductive groove, so that the power obtain structure is abutted with the power transmission strip.

Optionally, two through holes are provided and penetrate the power obtain portion, and the power obtain structure further includes connection portions provided at both ends of the abutment portion, and each of the connection portions passes through one of the through holes and is capable of moving up and down relative to the substrate.

Optionally, two mounting posts are provided and are respectively located at both ends of the elastic portion to correspond to the two through holes, the power obtain portion further comprises a support bridge located between the two through holes, each of the mounting posts is located in one of the through holes and is between one of the connection portions and the support bridge, and the connection portions are movable relative to the two mounting posts.

Optionally, the elastic portion is located between the abutment portion and the support bridge, and an upper surface of the elastic portion is in contact with the abutment portion, and a lower surface of the elastic portion is abutted with the support bridge.

Optionally, both ends of the elastic portion are provided with inclined surfaces, and the inclined surfaces each extends obliquely in a direction from an upper surface of the elastic portion toward the substrate.

Optionally, the lamp includes a housing connected to the substrate and a circuit board accommodated in the housing, and an end of the connection portion away from the abutment portion passes through the through hole and is fixedly connected to the circuit board so as to cause the power obtain structure to move synchronously with the circuit board.

Optionally, in a short edge direction of the lamp, a size of the elastic portion is larger than a size of the abutment portion.

Optionally, a middle position of the abutment portion is provided with a convex hull protruding toward the track, and the convex hull is capable of being abutted with the power transmission strip.

Optionally, the elastic structure is a U-shaped silicone pad, and the power obtain structure is a U-shaped metal sheet.

The beneficial effects of the present disclosure are: the track light of the present disclosure provides an elastic structure between the substrate and the power obtain structure, so that the power obtain structure is capable of moving toward the substrate in a case of being subjected to external pressure, in response to that the external pressure disappears, the power obtain structure is capable of moving away from the substrate under the action of the elastic structure, which avoids deformation of the power obtain structure and realizes repeated installation and use of the lamp; by providing the through hole in the substrate, and allowing the mounting post to be accommodated in the through hole and closely attached to the sidewall of the through hole, the elastic structure is capable of being detachably connected to the substrate, so that operators can improve the track light that have been produced or is already in use, extending the service life of the track light and avoiding waste of resources.

The above examples are only used to illustrate the technical solutions of the present disclosure and are not limiting. Although the present disclosure has been described in detail with reference to examples, those of ordinary skill in the art should understand that the technical solutions of the present disclosure can be modified or equivalently replaced without departing from the spirit and scope of the technical solution of this disclosure.

The invention claimed is:

1. A track light, comprising:

a track, and a lamp in electrical contact with the track, wherein:

the lamp comprises a substrate, an elastic structure detachably connected to the substrate, and a power obtain structure plugged and fixed on the substrate, wherein the substrate is provided with a through hole, the elastic structure comprises a mounting post and an elastic portion, the mounting post is accommodated in the through hole and is in contact with an inner sidewall of the through hole, and two mounting posts are provided and are respectively located at both ends of the elastic portion, a power transmission strip is provided in the track, and the power obtain structure comprises an abutment portion in electrical contact with the power transmission strip, the elastic structure is provided between the abutment portion and the substrate to generate elastic deformation in response to that the abutment portion and the power transmission strip are pressed against each other, so that the abutment portion and the power transmission strip remain abutted with each other.

2. The track light according to claim 1, wherein:

the substrate is provided with a power obtain portion extending toward the track, the power obtain structure is plugged and fixed with the power obtain portion, and the elastic structure is provided between the power obtain portion and the power obtain structure and is detachably connected with the power obtain portion, a conductive groove is provided in the track, the power transmission strip is provided in the conductive groove, and the power obtain portion is capable of extending the conductive groove, so that the power obtain structure is abutted with the power transmission strip.

3. The track light according to claim 2, wherein two through holes are provided and penetrate the power obtain portion, and the power obtain structure further comprises connection portions provided at both ends of the abutment portion, and each of the connection portions passes through one of the through holes and is capable of moving up and down relative to the substrate.

4. The track light according to claim 3, wherein the two mounting posts are respectively located at both ends of the elastic portion to correspond to the two through holes, the power obtain portion further comprises a support bridge located between the two through holes, each of the mounting posts is located in one of the through holes and is between one of the connection portions and the support bridge, and the connection portions are movable relative to the two mounting posts.

5. The track light according to claim 4, wherein the elastic portion is located between the abutment portion and the support bridge, and an upper surface of the elastic portion is in contact with the abutment portion, and a lower surface of the elastic portion is abutted with the support bridge.

6. The track light according to claim 1, wherein both ends of the elastic portion are provided with inclined surfaces, and the inclined surfaces each extends obliquely in a direction from an upper surface of the elastic portion toward the substrate.

7. The track light according to claim 3, wherein the lamp comprises a housing connected to the substrate and a circuit board accommodated in the housing, and an end of the connection portion away from the abutment portion passes through the through hole and is fixedly connected to the circuit board so as to cause the power obtain structure to move synchronously with the circuit board.

8. The track light according to claim 1, wherein, in a short edge direction of the lamp, a size of the elastic portion is larger than a size of the abutment portion.

9. The track light according to claim 1, wherein a middle position of the abutment portion is provided with a convex hull protruding toward the track, and the convex hull is capable of being abutted with the power transmission strip.

10. The track light according to claim 1, wherein the elastic structure is a U-shaped silicone pad, and the power obtain structure is a U-shaped metal sheet.

* * * * *